3,149,099
POLYMERIZATION OF CONJUGATED DIOLEFINES
Heinz Groene and Gottfried Pampus, Leverkusen, Germany, assignors to Farbenfabriken Bayer Aktiengesellschaft, Leverkusen, Germany, a corporation of Germany
No Drawing. Filed May 9, 1960, Ser. No. 27,486
Claims priority, application Germany May 16, 1959
6 Claims. (Cl. 260—94.2)

The present invention relates to a process for polymerizing 1,3-dienes. It has long been known to polymerize hydrocarbons of the butadiene series with the aid of alkali metals to form products of high molecular weight. This process is of particular interest for the polymerization of isoprene by using lithium, since it is possible in this way to obtain a polyisoprene with a substantially uniform structure, i.e. a polyisoprene in which the monomer units are predominantly linked in the 1,4-position and are present in the cisconfiguration. A polyisoprene of this structure corresponds substantially to natural rubber as regards its physical, chemical and technological properties and is consequently of great technical importance.

The polymerization of hydrocarbons of the butadiene series with alkali metals has the disadvantage that the catalyst only becomes active after a latent period, the duration of which depends very largely on factors which are very difficult to realize and reproduce. On the other hand, once the polymerization has started, it frequently proceeds so violently that controlled heat dissipation can no longer be successfully effected and polymers of low quality are obtained. Consequently, considerable difficulties are involved when this process is carried out technically.

Alkali organometallic compounds such as sodium or lithium alkyls have also been used as catalysts for the polymerization of conjugated diolefines. When using such catalysts, the polymerization is almost instantaneously started and the progress of the reaction can be more easily controlled. However, even then polymers of sufficiently high molecular weights to yield vulcanizates having high-grade technological properties are obtained only if the catalysts are used in very low concentration. However, this requires an exceptionally high degree of purity of the monomers, which can only be obtained with great expense.

It has now been found that the polymerization of hydrocarbons of the butadiene series can be effected without the aforesaid difficulties by using catalysts which are formed by reaction of alkali metals and/or alkali metal compounds with halogenated hydrocarbons in the presence of polyvalent metal oxides, metal hydroxides and/or metal oxide hydrates, the use of lithium and lithium compounds being of particular importance in the view of the preparation of catalysts for stereospecific polymerization.

Both the free alkali metals, such as for example metallic lithium, sodium or potassium, as well as compounds thereof known per se, which are capable to react with the halogenated hydrocarbons under formation of the respective alkali metal halides, can be used for the preparation of the catalysts according to the invention. Examples are inorganic compounds such as the hydrides, oxides, hydroxides, amides of alkali metals (sodium hydride, lithium hydride, lithium-aluminium hydride, sodium oxide, lithium hydroxide, sodium amide) as well as organic compounds such as alkyl, alkenyl, cycloalkyl, aralkyl, aryl alkali metal compounds, the organic radicals of which contain 1 to 20 carbon atoms (methyl-, ethyl-, butyl-, hexyl-, n-octadecyl-, phenyl-, tolyl-, allyl-lithium and the corresponding sodium and potassium compounds), furthermore sodium dialkylamides and lithium diarylamide (sodium dibutylamide, lithiumdiphenylamide).

Halogenated hydrocarbons suitable for the present process are saturated or unsaturated mono- or poly-halogen compounds of the aliphatic series of straight-chain or branched nature, such as for example ethyl bromide, isopropyl bromide, n-butyl chloride, isoamyl bromide, isoamyl iodide, stearyl chloride, vinyl chloride, allyl chloride, 1,4-dibromobutane, and also cycloaliphatic halides such as cyclohexyl chloride, as well as araliphatic halides such as for example benzyl chloride and benzal chloride and aromatic monohalogen or polyhalogen compounds such as bromobenzene, iodobenzene, chlorobenzene, 1,4-dibromobenzene, 1-bromonaphthalene. It is, of course, possible to use mixtures of the recited alkali metals and/or the reactive alkali metal compounds with mixtures of the recited halogenated hydrocarbons for the production of the present catalysts.

As oxide or hydroxide components of the catalysts, there can be used polyvalent metal oxides, metal hydroxides or metal oxide hydrates, advantageously those of the metals of the 2nd, 3rd, and 4th main group of the Periodic System of the elements. Examples of these are the oxides or hydroxides of beryllium, magnesium, calcium, strontium, barium, and also aluminium oxide, aluminium oxide hydrate (bauxite), kaolinite, bentonite, silicon dioxide, titanium dioxide, zirconium dioxide, tin dioxide, molybdenum oxide.

In accordance with one preferred form for the preparation of the catalysts according to the invention, first of all a dispersion of alkali metal and a suitable metal oxide in the weight ratio of advantageously 1:5 to about 1:50 is prepared in an inert anhydrous hydrocarbon, such as for example pentane, hexane, petroleum ether, cyclohexane, benzene, toluene, xylene, in an inert, preferably a rare gas or nitrogen atmosphere. It is advisable in this connection to use the metal oxides, etc., in finely divided form in order to avoid as far as possible a sedimentation during the production of the catalyst and also during the polymerization. Particularly effective catalysts are obtained when the metal oxides, etc. are subjected to a drying process prior to the preparation of the catalyst. In order to produce best possible properties, it is essential to adopt the drying conditions to the metal oxide, metal hydroxide, or metal oxide hydrate actually being used.

The dispersion thus obtained is mixed in an inert gas atmosphere with the halogenated hydrocarbon, preferably by slowly adding it to the halogenated hydrocarbon at temperatures from −20 to +100° C., preferably −10° up to +50° C., in such a quantity that at least one, preferably 1 to 4, alkali metal atoms are present per halogen atom. Metallic lithium is preferably used for this process. The dispersion hereby formed can be stirred for a time (such as 0.5 to 5 hours) at temperatures of about 0° to 100° C. in order to complete the reaction. During the reaction at least part of the alkali metal or alkali metal compounds is transformed into the corresponding alkali metal halide, whereby a dispersion of deep blue to black color is formed. The efficacy of the catalyst can be varied within wide limits by the nature of the composition and also by modifying the manufacturing conditions.

The present catalysts are suitable for the polymerization and copolymerization of 1,3-dienes having up to 9 carbon atoms such as butadiene, 1-methyl butadiene, 2-methyl butadiene, 2,3-dimethyl butadiene, 2-ethyl butadiene, 2-phenyl butadiene. Mixtures of these monomers such as butadiene and isoprene can, of course, also be used for the polymerization. Furthermore, it is possible to copolymerize the aforementioned dienes with monovinyl substituted aromatic hydrocarbons, such as styrene, vinyltoluene, methylstyrene, whereby these latter components are applied in amounts of about up to 40 percent by weight as calculated on the total monomers. As 1,3-dienes there can further be used halogenated butadienes, such as chloroprene. The monomers to be used for the polymerization should beforehand be purified in accordance with conventional known physical or chemical purifying processes, such as for example fractional distillation, heating with alkali metals, organometallic compounds, aluminium oxide, silica gel and other active adsorbents, heavy metal salts and the like, in order substantially to remove those compounds which would in foreseeable manner lead to a deactivation of the catalyst system.

The catalyst concentration is generally so adjusted that about 0.01 to 1.0 part by weight of alkali metal are present in 100 parts by weight of monomer.

The polymerization is preferably carried out with exclusion of atmospheric oxygen and moisture in an inert atmosphere, such as nitrogen, helium, argon, hydrocarbon vapors and the like. Polymerization can take place in block form or in solution. Suitable solvents and diluents are saturated hydrocarbons, such as propane, butane, pentane, hexane and also mixtures of such hydrocarbons, such as for example petroleum ether. Kerosene, diesel oil, paraffin oil and cycloaliphatic hydrocarbons such as cyclohexane and aromatic hydrocarbons such as benzene, toluene, xylene can also be used for the same purpose. The reaction temperature is preferably not higher than $+90°$ C. and is advantageously $-10$ to $+60°$ C. The pressure conditions are not critical for the progress of the polymerization. It is possible to work at atmospheric pressure, and also at reduced or elevated pressures. The polymerization is advantageously caused to proceed at pressures such as those given at the reaction temperatures being used by the vapor pressures of the monomers and solvents being employed.

After completing the polymerization, the polymer is obtained as a solid mass where no solvent has been used or as a viscous solution when a solvent has been used. By treatment with alcohols, acetone, alcohol/water and acetone/water mixtures, if necessary in the presence of inorganic or organic acids, the polymer can be precipitated. The reactive alkali metal compounds being simultaneously deactivated and removed. When working up, it is preferred to add stabilizers and anti-oxidizing agents, such as phenyl-β-naphthylamine, N,N'diphenyl-p-phenylene diamine, di-tert.-butyl-p-cresol, di-tert.-butyl hydroquinone, tris-(nonylphenyl)-phosphite and the like in order to avoid an oxidation of the sensitive polymer and thus the premature degradation thereof. However, it is also possible to add substances immediately after completion of the polymerization which deactivate the catalyst, such as for example organic acids, and thereafter to incorporate stabilizers and antioxidizing agents, the solvent being removed in a suitable apparatus, such as for example a kneader or a worm. The drying of the stabilized polymerization products can be effected in air or in vacuo at normal or elevated temperatures.

The polymerization by means of the catalysts which have been described can take place intermittently or continuously. Suitable for the intermittent process are bottles, stirrer-type vessels and autoclaves with which it is possible to work under inert conditions. A worm has proved suitable for the continuous process and it has proved to be desirable to connect an initial polymerization vessel before the worm in order to keep the residence time in the worm member proper as short as possible.

The copolymerization of different diolefines, such as for example isoprene and butadiene, can readily be carried out in the same way.

In contrast to the known processes, no latent periods or only extremely short latent periods occur when using the catalysts according to the invention. Another essential advantage of the process described herein is that the polymerisation proceeds uniformly, even when using relatively large batches, and can be controlled without the use of expensive equipment. The polymers produced by the present process have very high molecular weights, i.e. such as could only otherwise be produced by means of the known catalysts which are difficult to control as regards their latent period. In accordance with the process, it is for example readily possible to prepare polymers with a limiting viscosity of $[\eta]=8$. The proportion of gel in these polymers is very small.

As compared with the use of rare gases when employing metallic lithium, the possibility of using nitrogen as inert gas during the polymerisation provides a considerable technical advance.

The danger of the molecular weights being lowered by excessive supply of the catalyst is moreover considerably reduced, since the maximum concentration thereof is not by any means as critical as it is with the hitherto known alkali organometallic catalysts.

The polymerisation of isoprene with lithium-containing catalysts of the type described yields polyisoprenes which are found by infra-red spectroscopic investigation to be more than 90% linked in the 1,4-cis-arrangement.

The polymers obtained by the process described can be worked by the conventional methods into elastic products with good technological properties, i.e. they can for example be vulcanised by adding usual fillers, pigments, stabilisers and age resisters. Particular technical importance is attributed to the isoprene polymers produced in this way, which can in known manner be worked into vulcanizates which show the advantageous properties of natural rubber, more especially a low hysteresis and also a high elasticity and tensile strength with a low degree of hardness.

The parts indicated in the following examples are parts by weight, unless otherwise indicated. Furthermore, in the following experiments, the corresponding catalysts are prepared in a rare gas atmosphere, whereas the polymerisation is conducted under nitrogen.

*Example 1*

25.0 parts of finely powdered and dried silicon dioxide are stirred with 0.65 part of lithium and 100.0 parts of cyclohexane to form a fine dispersion. 3.29 parts of n-butyl chloride are slowly added thereto while stirring vigorously. A bluish-grey readily mobile dispersion is obtained.

9.0 parts of the catalyst suspension prepared in this way are introduced into 100.0 parts of isoprene, which is dried and purified by boiling over sodium. Polymerisation is carried out at 50° C., starts after a few minutes and is completed after about 12 hours. A viscous polymer is obtained which is washed with methanol to remove the catalyst and is stabilised with phenyl-β-naphthylamine. The yield is 96% of the theoretical. The proportion of polymer with 1,4-structure is 94.2%, according to the infra-red spectrum.

*Example 2*

25.0 parts of titanium dioxide (anatase) and 0.65 part of lithium are finely dispersed by vigorous stirring in 15.0 parts of petroleum ether. 4.87 parts of n-butylbromide are then slowly added. The dispersion becomes deep bluish-green in colour. The stirring is continued for about 1 hour at 30° C.

4.5 parts of the catalyst dispersion are introduced with exclusion of air and moisture into 100.0 parts of isoprene purified as in Example 1. Polymerisation soon commences at 60° C. and proceeds very uniformly, being stopped after 8 hours. The highly viscous polymerisation product is washed with a mixture of acetone, water and acetic acid for destroying the catalyst and thereafter is stabilised by adding N,N'-diphenyl-p-phenylene diamine. 67.0 parts of polymer are obtained, this having a $[\eta]$ value of 4.64 and a proportion of 93.9% of the polymer with 1,4-structure.

Example 3

25.0 parts of calcium kaolinite are stirred with 0.6 part of lithium and 20.0 parts of paraffin oil and 10.22 parts of stearyl chloride are slowly added dropwise thereto. The dispersion slowly becomes pale blue in colour. Stirring is continued for 2 hours at —5° C.

8.0 parts of the catalyst suspension are introduced into a mixture of 100.0 parts of isoprene purified as in Example 1 and 200.0 parts of petroleum ether. Polymerisation is effected at 40° C. within 16 hours and the viscous solution is then treated with a 2% solution of phenyl-β-naphthylamine in methanol/water/acetic acid. 83.0 parts of a tough, rubber-like polymer are thereby obtained, which contains a proportion of 94.7% of 1,4-polymer. The proportion of gel in the polymerisation product is 2.2%.

Example 4

A suspension of 50.0 parts of calcined aluminum oxide and 1.8 parts of lithium in 40.0 parts of cyclohexane are caused to react with 9.89 parts of n-butyl chloride. The deep blue suspension is stirred for about 2 more hours at 40° C. and stirred with a mixture of 500.0 parts of isoprene purified as in Example 1 and 1500.0 parts of cyclohexane in an autoclave. The temperature of the autoclave is kept at 40° C. and the polymerisation is stopped after 13 hours. The viscous mass is first of all treated with a 2% solution of phenyl-β-naphthylamine in acetone/water/acetic acid and thereafter washed with water, additional stabiliser being introduced. The material dried in vacuo has a [$\eta$] value of 11.7, a 1,4-polymer proportion of 94.8% and a gel content of 3.1%. The yield is 455.0 parts of polyisoprene.

The polymer prepared according to Example 4 was vulcanized for 5 minutes at 151° C. in accordance with the following specification:

|  | Parts |
|---|---|
| Polyisoprene | 100.0 |
| Carbon black (inactive) | 30.0 |
| Zinc oxide (active) | 5.0 |
| Phenyl-β-naphthylamine | 2.0 |
| Stearic acid | 1.0 |
| Paraffin | 0.6 |
| Accelerator (0.5 part of dibenzthiazyl disulphide +0.2 part of diphenyl guanidine) and | 0.7 |
| Sulphur | 2.5 |

The vulcanisate had the following properties:

| | |
|---|---|
| Tensile strength | 153 kg./cm.³ |
| Elongation | 810%. |
| Rebound elasticity, 25° C. | 64%. |
| Elasticity, 75° C. | 72%. |
| Hardness, 25° C. | 45° Shore. |
| Notch toughness | 18 kg./abs. |

Example 5

A suspension of 28 parts of calcined aluminum oxide and 1 part of lithium in 22 parts of n-hexane is reacted with 5.5 parts of n-butyl chloride. The resulting deep blue suspension is stirred for about 2 hours at 40° C. and then pressed into an autoclave which has been rinsed with argon together with 400 parts by weight of butadiene and 1200 parts n-hexane. While stirring, the suspension is heated to 50° C. After 10 hours polymerization is interrupted and the resulting viscous mass is treated with alcohol containing 1 percent of phenyl-β-naphthylamine and 5 percent of acetic acid. The isolated polybutadiene is dried in vacuo. Yield: 375 parts by weight having an ($\eta$) value of 5.42 and a proportion of 1,4-structure of 87 percent.

Example 6

20 parts of the catalyst described in Example 5, 120 parts of n-hexane and a mixture of 48 parts of isoprene and 30 parts of butadiene are pressed into an autoclave from which the air has been removed by means of argon. The suspension is heated for 12 hours at 50° C. while stirring. The resulting viscous mass which has formed during that time is treated with alcohol containing 1 percent of phenyl-β-naphthylamine and 2 percent of acetic acid. After drying in vacuo 72 parts by weight of a copolymer having an ($\eta$) value of 6.5 are obtained.

Example 7

1 part of sodium metal is heated together with 10 parts of dried aluminum oxide under argon to 150° C. until a homogeneous black powder has formed which does not contain any compact metal parts. The black powder is suspended in 100 parts of n-heptane and mixed with 6.8 parts of n-amyl chloride at 10° C., and 7 parts of the deeply colored dispersion obtained are used for the polymerization of 150 parts of isoprene. Polymerization and working up are carried through as described in Example 2. 140 parts of polymer are obtained having an ($\eta$) value of 3.2, 22 percent of the monomeric units being linked in 1,4-cis-position and 45 percent in 3,4-position.

Example 8

20 parts of the catalyst described in Example 5 are pressed into an autoclave from which the air has been removed by means of nitrogen together with 70 parts of isoprene and 30 parts of styrene. The mixture is heated for 8 hours to 50° C. while stirring. The polymer obtained is treated with alcohol containing 2 percent acetic acid and is thereafter stabilized with 1 percent of phenyl-β-naphthylamine. After drying in vacuo at 50° C. there are obtained 95 parts of an isoprene-styrene copolymer having an ($\eta$) value of 7.0.

Example 9

Into a suspension of 6 parts of calcined aluminum oxide and 3 parts of lithium in 50 parts of n-hexane, 1.77 parts of n-butylchloride are slowly added dropwise while stirring. Thereafter, the mixture is stirred for 2 hours at 50° C. A mixture of 50 parts of n-hexane and 50 parts of 2-chlorobutadiene-1,3 is added to the catalytic suspension. The mixture is polymerized for 8 hours at 50° C. and thereafter the reaction is added to a solution of 2 parts of di-tert. butylphenol in 300 parts of isopropanol. The precipitated polymer is washed with water until neutral and dried in vacuo at 50° C. 35 parts of a tough elastic product are obtained.

We claim:

1. A process for the polymerization of a 1,3-diene having 4–9 carbon atoms which comprises contacting said diene in an inert medium and under an inert gas atmosphere at a temperature not exceeding about 90° C. with a catalyst composed of particles of a solid catalyst dispersed in an inert anhydrous hydrocarbon vehicle, this catalyst dispersion being obtained by mixing under an inert gas (a) a dispersion of finely divided metallic lithium in an inert anhydrous hydrocarbon containing about one part by weight of lithium to about two parts by weight of an oxide in finely dispersed form which is selected from the group consisting of aluminum oxide, silicon dioxide and titanium oxide, with (b) a halogenated hydrocarbon selected from the group consisting of an aliphatic halide, a cycloaliphatic halide, an araliphatic halide, and an aromatic halogen compound, reactants (a) and (b) being mixed in such a quantity that at least one lithium atom is present for each halogen atom, the lithium reacting with the halogenated hydrocarbon to form a catalyst dispersion which is employed in said polymerization process in an amount of 0.5–20 parts by weight of the solid catalyst in the dispersion per 100 parts by weight of diene.

2. The process of claim 1 wherein the reaction between the halogenated hydrocarbon and the metallic lithium is carried out at a temperature between —20 and 100° C.

3. The process of claim 1 wherein the halogenated hydrocarbon is selected from the group consisting of aliphatic hydrocarbon chlorides, bromides and iodides having 1–20 carbon atoms.

4. The process of claim 1 wherein said halogenated hydrocarbon is butyl chloride.

5. The process of claim 1 wherein said halogenated hydrocarbon is butyl bromide.

6. A process for the polymerization of a 1,3-diene having 4–9 carbon atoms which comprises contacting said diene in an inert medium under an inert gas atmosphere at a temperature not exceeding about 90° C. with a catalyst composed of particles of solid catalyst dispersed in an inner anhydrous hydrocarbon vehicle, this catalyst dispersion being obtained by mixing under an inert gas (a) a dispersion of finely divided metallic lithium in an inert anhydrous hydrocarbon containing about one part by weight of lithium to about two parts by weight of aluminum oxide in finely dispersed form, with (b) a halogenated hydrocarbon selected from the group consisting of an aliphatic halide, a cycloaliphatic halide, an araliphatic halide and an aromatic halogen compound, reactants (a) and (b) being mixed in such a quantity that at least one lithium atom is present for each halogen atom, the lithium reacting with the halogenated hydrocarbon to form a catalyst dispersion which is employed in said polymerization process in an amount of 0.5-20 parts by weight of the solid catalyst in the dispersion per 100 parts by weight of diene.

References Cited in the file of this patent

UNITED STATES PATENTS

| | | |
|---|---|---|
| 2,947,737 | Stearns | Aug. 2, 1960 |
| 2,965,626 | Pilar | Dec. 20, 1960 |

FOREIGN PATENTS

| | | |
|---|---|---|
| 1,159,498 | France | Feb. 10, 1958 |
| 223,817 | Australia | Sept. 11, 1959 |
| 218,149 | Australia | Aug. 22, 1958 |

OTHER REFERENCES

Emmett: "Fundamental Principles of Catalysis," pages 245–72, Reinhold Publishing Corporation, New York, 1954.

Gaylord et al.: "Linear and Stereoregular Addition Polymers," pages 240–257 and 400–7, Interscience Publishers, Inc., New York, 1959.